United States Patent [19]

Hardee et al.

[11] Patent Number: 5,031,717

[45] Date of Patent: * Jul. 16, 1991

[54] ADVANCED DOWNHOLE PERIODIC SEISMIC GENERATOR

[75] Inventors: Harry C. Hardee, Albuquerque; Richard G. Hills, Las Cruces; Richard P. Striker, Albuquerque, all of N. Mex.

[73] Assignee: Richard G. Hills, Las Cruces, N. Mex.

[*] Notice: The portion of the term of this patent subsequent to Feb. 21, 2006 has been disclaimed.

[21] Appl. No.: 312,683

[22] Filed: Feb. 17, 1989

Related U.S. Application Data

[63] Continuation-in-part of Ser. No. 437,404, Oct. 28, 1982, Pat. No. 4,805,727.

[51] Int. Cl.$^5$ .............................................. G01V 1/40
[52] U.S. Cl. ..................................... 181/106; 367/75
[58] Field of Search ............... 181/106, 103, 104, 401; 367/25, 911

[56] References Cited

U.S. PATENT DOCUMENTS

| | | | |
|---|---|---|---|
| 3,221,833 | 12/1965 | Malmberg | 181/106 |
| 3,718,205 | 2/1973 | Fair | 367/189 |
| 3,785,200 | 1/1974 | Hardy | 73/151 |
| 3,909,776 | 9/1975 | Broding et al. | 181/106 |
| 4,042,063 | 8/1977 | Waters | 181/119 |
| 4,252,210 | 2/1981 | Sodich | 181/119 |
| 4,702,343 | 10/1987 | Paulsson | 181/106 |
| 4,805,727 | 2/1989 | Hardee et al. | 181/106 |
| 4,815,557 | 3/1989 | Duwe | 181/106 |

OTHER PUBLICATIONS

"Downhole Periodic Seismic Sources", H. C. Hardee, *Geophysical Prospecting* 31, 57–71, 1983.
"Downhole Seismic Source", H. C. Hardee, G. J. Elbring and B. N. P. Paulsson, *Geophysics*, vol. 52, No. 6 (Jun. 1987).
"Downhole Seismic Source Performs Well in Field Tests", News Release, Sandia National Laboratories, Jul. 28, 1988.
"Downhole Seismic Signal Tool Ready for Service", *Oil and Gas Journal*, Aug. 22, 1988, p. 28.
"Downhole Seismic Tool Detects Underground Fluids", *Petroleum Engineer International*, Dec. 1987, p. 48.

*Primary Examiner*—Ian J. Lobo
*Attorney, Agent, or Firm*—John R. Lansdowne

[57] ABSTRACT

An advanced downhole periodic seismic generator system for transmitting variable frequency, predominantly shear-wave vibration into earth strata surrounding a borehole. The system comprises a unitary housing operably connected to a well head by support and electrical cabling and contains clamping apparatus for selectively clamping the housing to the walls of the borehole. The system further comprises a variable speed pneumatic oscillator and a self-contained pneumatic reservoir for producing a frequency-swept seismic output over a discrete frequency range.

18 Claims, 5 Drawing Sheets

Fig. 3E

ADVANCED DOWNHOLE PERIODIC SEISMIC GENERATOR

STATEMENT AS TO RIGHTS OF INVENTION

The U.S. Government has a paid-up licence in this invention and such other rights required under 41 CFR 9-9.109.6 to be retained by or reserved to the U.S. Government.

CROSS REFERENCE TO RELATED APPLICATION

This application is a continuation-in-part of the application entitled DOWNHOLE PERIODIC SEISMIC GENERATOR, Ser. No. 437,404 and filed Oct. 28, 1982, now U.S. Pat. No. 4,805,727.

FIELD OF INVENTION

The present invention relates to the generation of seismic signals for use in determining the structural characteristics of earth strata and more particularly, but not by way of limitation, to a downhole periodic seismic generator for the transmission of variable swept-frequency predominantly shear-wave vibrations into earth strata formations surrounding a borehole.

DESCRIPTION OF RELATED ART

Methods of conducting seismic exploration include the production and transmission of seismic waves through the earth's surface and the positioning of geophone receivers at strategic locations in the area of interest for receiving the reflected signals. These reflected signals are then correlated with the source of the seismic shook waves in an effort to determine the characteristics of the earth's strata in the area of interest.

Explosive charges have been widely used as a source of these seismic waves but have several disadvantages, one of which is the unpredictable characteristics of the explosive sources.

With the development of sophisticated receiving equipment, it has become feasible to induce low frequency vibration signals into the earth whereupon, the reflected signal is electronically correlated to the source signal. A primary method of inducing earth vibration has been to produce shear waves by vibrating a surface base plate which is in contact with the earth. However, in order to obtain the needed vibrational force, extremely large vehicles have been necessary in order to hold the base plate against the earth.

Another problem associated with this method is that of attenuation of the signal as it passes through the softer surface layers of the earth, hence, greatly limiting the effective depth of exploration. In fact, it has been determined that periodic seismic sources generated at the surface lose as much as two-thirds of the input energy in surface or Rayleigh waves while a significant portion of the remaining signal made up of pressure (p) waves and shear (s) waves are attenuated in the porous surface layers of the earth. These porous surface layers often extend to depths as much as 3000 feet.

Once below surface layers, shear waves propagate very well to produce valuable seismic information. It has been found that shear waves reflected at significant depths are extremely useful in detecting underground gases and liquids such as molten magma, geothermal fluids, fossil fuels and the like.

In order to overcome this inherent disadvantage, various attempts have been made to position a seismic source inside a borehole at depths below the surface porous layers. Typical Of these devices are found in the teachings of the patent to Malmberg, U.S. Pat. No. 3,221,833 issued Dec. 7, 1965, for a "Geophysical Bore Hole Apparatus" and the patent to Fair et. al., U.S. Pat. No. 3,718,205 issued Feb. 27, 1973, for a "Bore Hole Seismic Transducer". However, such systems have enjoyed limited success through ineffective coupling with the borehole wall and the utilization of fluid drive sources located at the wellhead requiring elaborate.

The patent to Brooding et. al., U.S. Pat. No. 3,909,776 issued Sept. 3, 1977, entitled "Fluid Oscillator Seismic Source" recognized the value of inducing a variable frequency seismic source downhole, but again, was hampered by the fluid drive source being located at the wellhead and having to maintain fluid pressure throughout an elongated pipe or annulus.

A further disadvantage occurring with the use of a variable frequency seismic oscillator is that typically as the frequency of the oscillator piston or "hammer" increases, the power of the seismic pulse decreases thereby resulting in an undesirable decrease in amplitude of the resulting seismic wave over the frequency sweep.

When the wellhead equipment is used to provide the fluid drive source, the low signal to noise often requires at the surface equipment consisting of pumps and the like be shut down during the time that the reflected signals are being received which further complicates and hampers the use of existing downhole seismic generators.

It has been suggested in the art that the problem of signal attenuation could be relieved by drilling several boreholes at strategic locations in the area of interest. A periodic seismic source is then lowered into one of the boreholes while geophone receivers are lowered into the others. While this system appears to have merit, the problem with existing downhole seismic sources as here before pointed out are still prevalent.

SUMMARY OF THE INVENTION

The present invention provides a downhole seismic generator system for transmitting variable frequency seismic waves, predominately shear waves, into earth strata formations surrounding a borehole and which is designed to overcome the above disadvantages.

This system comprises an elongated unitary housing which is clampable to the borehole wall and operably connected to an electrical control device at the wellhead by electrical cables and support cables. The system is compatible with commercially available standard logging cable containing both electrical wires and support lines in a single cable.

The housing contains a seismic generator which generally comprises a self-contained pneumatic reservoir which is charged with a compressible fluid such as a pressurized gas or a liquified gas before lowering the generator into the borehole. The reservoir is operably connected to a reciprocating piston or hammer through a variable speed electrically driven valve which is controlled from the wellhead.

A clamping apparatus is provided at the lower portion of the housing having one or more extendable shoe members which may be extended outwardly into rigid engagement with the borehole wall for conducting seismic vibration from the reciprocating hammer into the surrounding earth strata.

The pneumatic reservoir comprises an elongated cylinder which may have a two-way drive piston disposed therein. This drive piston is mechanically connected to an electric motor capable of driving the piston in either direction. Each end of the cylinder is provided with gas passageways which are in communication with the reciprocating hammer through a hammer control valve. The hammer control valve is in turn operably connected to the aforementioned variable speed motor.

The reciprocating hammer is freely carried in an elongated longitudinally disposed chamber, each end of which is connected by ports and passageways to the hammer control valve. The hammer is made to oscillate in the range of 0.5 Hz to 600 Hz by pressurized gas forced from the reservoir and applied alternately to each side of the hammer chamber. When pressurized gas is applied to one portion of the hammer chamber, the opposite portion is ported to the low pressure side of the hammer chamber. Therefore, when the hammer has completed its travel in the chamber, its direction is reversed to provide that same gas under pressure during a reverse stroke.

As hereinbefore stated, it has been found that as the frequency of the hammer increases, there is a power drop thereby reducing the output amplitude of the seismic waves generated by the hammer. This problem is significantly reduced or eliminated by the design of the reciprocating hammer and hammer chamber. The configuration of the hammer and sizing of the gas passageways associated therewith are designed such that a portion of the gas remains in the hammer during exhaust to provide a cushion or spring effect. This feature can be combined with selection of a hammer mass to produce a resonant frequency that maximizes the output amplitude of the generated seismic wave over the operating frequency.

One method is to set the resonant frequency just beyond the maximum operating frequency of the generated seismic wave. Therefore, as the oscillating frequency of the hammer approaches the upper end of its frequency range, the hammer approaches resonance, thereby resulting in an increased ratio of output energy to input energy so that although the input energy is decreasing, the output energy is being maintained somewhat constant. A second method is to set the resonant frequency low enough such that it is reached early in the sweep of frequency. Then various harmonics of the resonance will be encountered at regular intervals as the sweep proceeds. The seismic output ar the primary resonance and at the secondary harmonics will be large and this will tend to keep the seismic output relatively constant and large over the entire frequency sweep.

The clamping apparatus generally comprises a pair of outwardly extendable shoe members having serrated outer surfaces for engaging either the wall of the borehole or a casing member carried therein. The shoe members are connected to linkage arms which are in turn carried by an elongated screw rod. The rod is coupled to the shaft of a reversible servo motor for operating in either direction and looking in any desired position.

Hence, the present invention provides a system which is mechanically self-contained needing only electrical and support cables extending to the wellhead.

OBJECTIVES OF THE INVENTION

An objective of the invention is to provide a downhole periodic seismic generator system for transmitting shear wave vibrations over discrete low frequency ranges into earth strata formation surrounding a borehole. Another objective of the invention is to provide an oscillating hammer whereby the resonance frequency of the oscillator hammer is appropriately set to maximize the seismic output over the swept-frequency operating range and to produce a relatively flat output response.

Another objective of the invention is to provide a self-contained pneumatic reservoir for driving the oscillating hammer. Such self-contained pneumatic reservoir may consist of internal high-pressure bottles of gas or liquified gas carried inside the seismic source and recharged at the surface.

Another objective of the invention is to provide a self-contained pneumatic reservoir which employs a two-way drive piston for providing gas pressure to the oscillating hammer whereby driving the piston in either direction provides a downhole recyclable gas supply.

Another objective of the invention is to provide a downhole periodic seismic generator having a mechanical clamping apparatus which is simple in construction and efficient in operation.

BRIEF DESCRIPTION OF THE DRAWINGS

Other and further advantageous features will hereinafter more fully appear in connection with a detailed description of the drawings in which:

FIGS. 3A-3E are sectional segmented views of the downhole seismic generator wherein; FIG. 3A depicts the cable support end of the generator, FIGS. 3B and 3C show the self contained pneumatic reservoir segment, FIG. 3D depicts the oscillating hammer portion, FIG. 3E depicts the clamping apparatus with the shoe members, partially extended;

DESCRIPTION OF THE PREFERRED EMBODIMENTS

Figure 1:
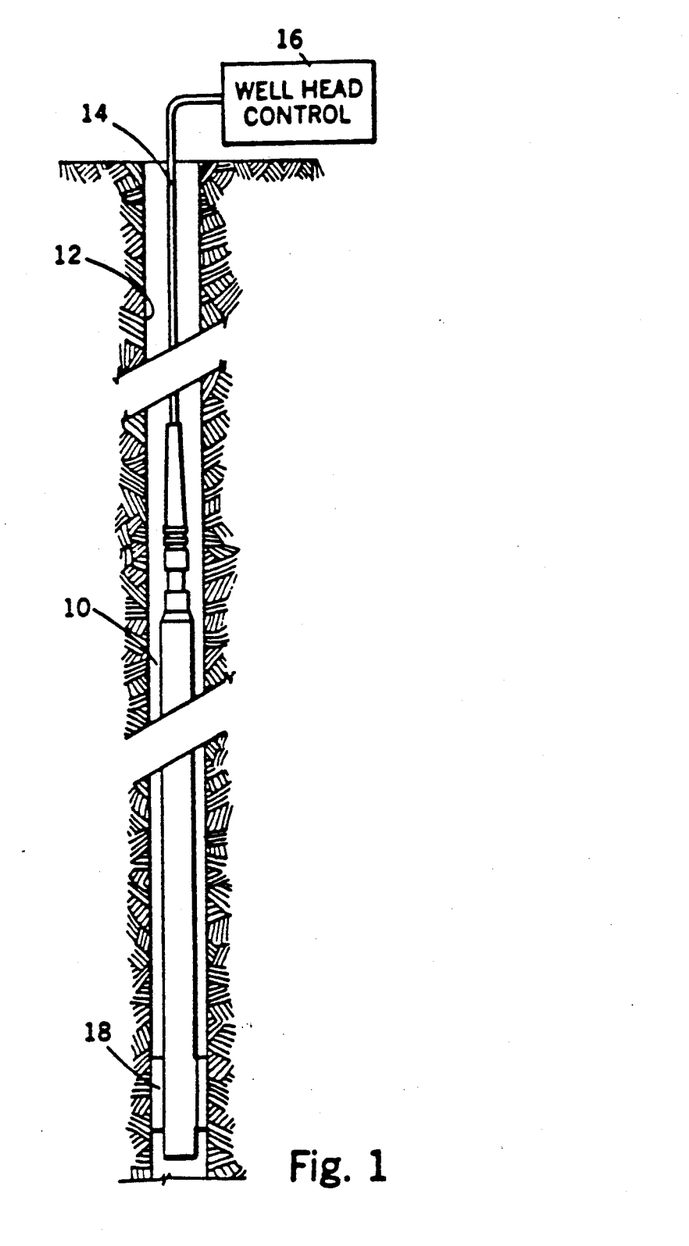
FIG. 1 is an elevational section view of a borehole containing a seismic generator system embodying the present invention.

Referring to the drawings in detail, reference character 10 generally depicts a downhole periodic seismic generator suspended in a borehole 12 by means of a cable assembly 14 which is operably connected to a wellhead control device 16. FIG. 1 generally depicts a clamp coupling means 18 which serves to rigidly secure the seismic generator 10 in engagement with the borehole wall 12.

Figure 2:
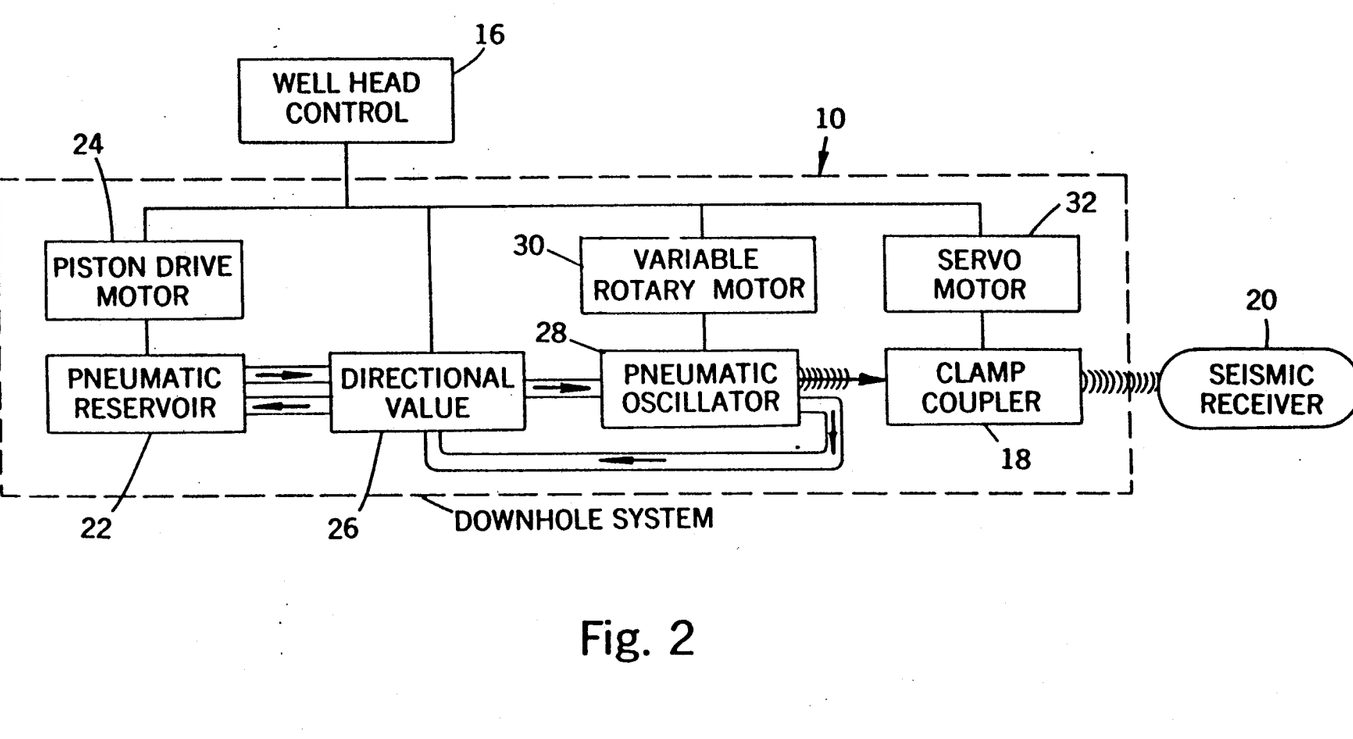
FIG. 2 is a schematic block diagram of the seismic generator system of FIG. 1.

FIG. 2 schematically depicts a seismic generator system 10 which is electrically controlled from the wellhead 16 for providing periodic seismic generated waves for receipt by one or more geophone receivers generally indicated by reference character 20 which may be located at strategic positions at the surface or may be disposed in adjacent boreholes.

The downhole system generally comprises a self-contained pneumatic reservoir 22 for providing gas under pressure to a directional control valve 26. The pneumatic reservoir 22 contains a high-pressure gas supply chamber and a low-pressure gas receiver chamber. The high-pressure gas supply chamber may be charged at the surface prior to lowering the instrument into a hole. Either high-pressure gas, such as argon or nitrogen, or liquified gas, such as liquified carbon dioxide, may be used.

While any type of high pressure gas can be used to power the seismic generator, a monatomic gas, such as argon, is more efficient than a polyatomic gas, such as nitrogen. The reason is that a monatomic gas maintains a higher pressure for a fixed volume change upon expansion than does a polyatomic gas. This higher pressure results directly in higher seismic output of the generator.

The use of liquified gas greatly increases the available operating time of the seismic instrument and eliminates the need for a downhole recyclable pneumatic supply. If ordinary high pressure gas is used in the pneumatic reservoir 22, the downhole operating time can be extended by recycling the gas from the pneumatic reservoir 22 by means of a piston drive motor 24. The piston drive motor 24 is used to periodically repressurize the gas in the high pressure chamber of the pneumatic reservoir 22. The gas going to and from the pneumatic reservoir 22 is directed by a directional control valve 26. The directional control valve in turn supplies the pressurized gas to a longitudinally disposed pneumatic oscillator 28, the frequency of oscillating being controlled by a variable speed electric motor 30. The gas after being passed through the oscillator 28 may be returned through the directional control valve to the low pressure side of the pneumatic reservoir for reuse in a manner that will be hereinafter set forth.

For shallow applications of up to 1,000 feet in depth, it may be desirable and efficient to supply recharge gas continuously from the surface by means of downhole gas hoses. This is particularly effective when the application or use is shallow, many repetitive runs of the seismic generator are necessary, and the generator is being operated with a high pressure gas such as argon or nitrogen.

The clamp coupler 18 is an electro-mechanical apparatus for selectively clamping the downhole system 10 into rigid engagement with the borehole wall whereby the energy may be transmitted from the oscillator 28 to the earth's strata surrounding the borehole 12. The clamp is operated by an electrical servo-motor 32.

Operational frequencies of the seismic generator are dependent on variables such as the mass of the hammer, nature of the gas utilized, and design of the rotary valve. However, experimental use of the generator to date has pointed to operational frequencies in the range of 20 Hz to 280 Hz.

Referring now to FIGS. 3A through 3E of the drawings, the downhole seismic generator 10 comprises an elongated cylindrical housing 34 which is physically supported by the cable assembly 14 through a cable coupling apparatus generally indicated by reference character 36. The cable assembly 14 comprises both support cabling and electrical cabling, the electrical cabling comprising both electrical transmission lines for the operation for the downhole electrical motors in addition to electrical signal control lines. The support cabling is attached to the housing 34 by means of the coupling apparatus 36 as is well known in the art while the electrical cables are passed through a connector indicated by reference character 38 to facilitate detaching the downhole system from the cable assembly.

Figure 3A:
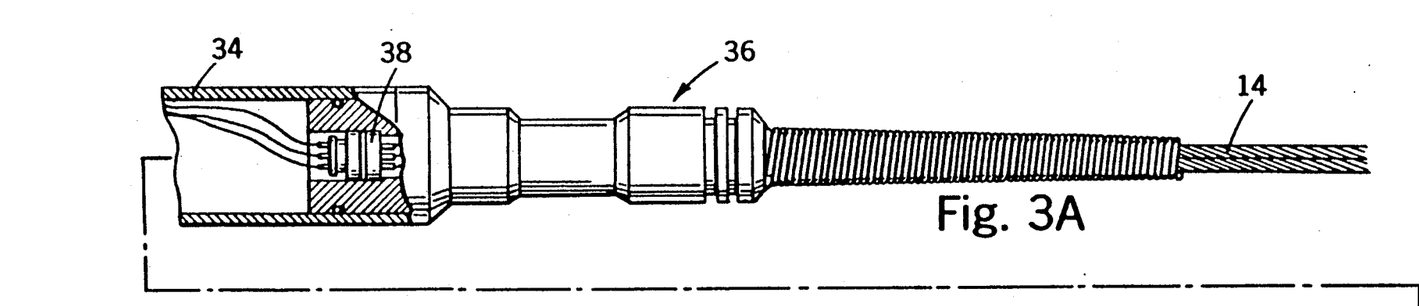

A first housing segment 40 contains the reversible electric motor 24 which has an output rotary shaft 42. The output shaft 42 is operably connected to one end of an elongated threaded rod 44 by way of mechanical coupling 46 whereby the rod 44 rotates with the motor output shaft 42. The rod 44 is journaled in a second housing segment 48, one end of the rod 44 extending through a partition plate 50.

Figure 3B:
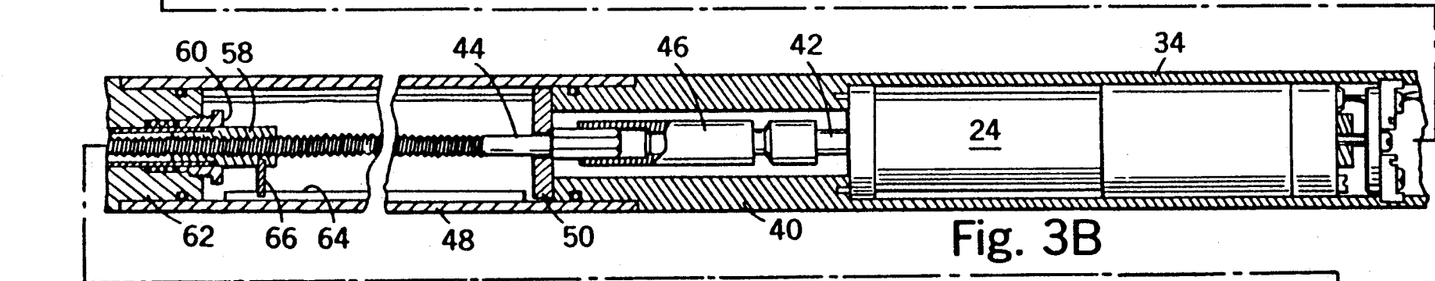
Figure 3C:
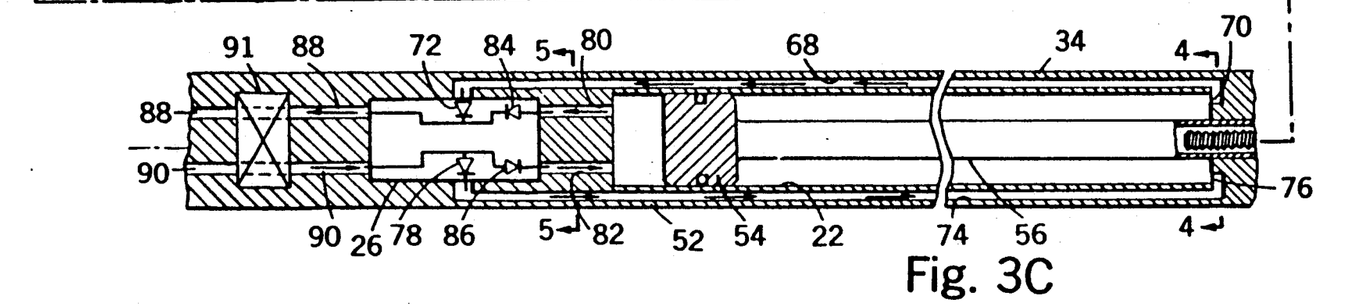

A third housing segment 52 contains the pneumatic reservoir 22. A sealed pneumatic piston 54 is reciprocally disposed in the pneumatic reservoir 22 and is carried by an elongated hollow piston rod 56. The upper or outer end of the piston rod 56 is provided with an internally threaded sleeve member 58 which is threadily disposed about the elongated rod 44. The sleeve member 58 and associated piston rod 56 are slidingly disposed in a gland nut 60 which in turn is carried by a block portion 62 which separates the housing segments 48 and 52. The sleeve member 58 is prevented from rotating with the threaded rod 44 by means of an elongated track 64 and associated finger member 66. The track 64 is carried within the housing segment 48 while the finger member 66 is attached to the sleeve member 58. Hence, rotation of the threaded rod member 44 causes the sleeve member 58 and associated piston rod 56 to slide longitudinally through the gland nut 60 thereby imparting a reciprocal movement to the piston member 54.

A first pneumatic pressure passageway 68 is provided in the housing segment 52, an upper end thereof being ported into the upper end of the reservoir 22 at reference character 70. The opposite end of the passageway 68 is connected into a one-way or check valve 72 carried by the directional control valve 26 which is disposed at the opposite or lower end of the pneumatic reservoir 22. A second return gas passageway 74 is provided in the housing segment 52 having one end ported to the upper end of the pneumatic reservoir 22 at reference character 76. The opposite end of the passageway 74 is connected to a second one-way or check valve 78 which is also carried by the directional control valve 26.

The lower end of the pneumatic passageway 22 is in communication with the directional control valve 26 by way of a pressure passageway 80 and a return passageway 82. The pressure passageway 80 is connected to a one-way or check valve 84 while the return passageway 82 is connected to a check valve 86 both contained in the directional control valve 26. The lower end of the directional control valve 26 is connected to a pressure passageway 88 and a single return passageway 90.

Therefore, if the reversible electrical motor 24 is made to rotate the operator rod 44 in a first direction, the piston 54 is moved downwardly thereby causing pressurized gas to flow through the passageway 80, the check valve 84, and into the pressure passageway 88. The check valve 72 prevents gas from passing through the passageway 68 to the upper end of the pneumatic chamber 22. At the same time, return gas from the passageway 90 may flow through the check valve 78 in the directional control valve 26 and through the passageway 74 into the upper end of the pneumatic chamber 22.

Likewise, when the motor 24 is rotated in the opposite direction, pressurized gas from the upper end of the piston passes through the passageway 68, the check valve 72, and into the pressure passageway 88. Likewise, return gas then flows through the check valve 78 and the return passageway 82.

The pressure passageway 88 and return passageway 90 are interrupted by a valve member 91 for selectively blocking the passageways. By closing the valve 91, the position 54 may be moved in one direction in order to, in effect, charge the pneumatic reservoir with gas under pressure where upon opening the valve 91 releases the pressurized gas to the hammer oscillator section as will be hereinafter set forth.

Hence, the pneumatic reservoir provides a supply of gas from a high pressure chamber and provides a low pressure chamber for the exhaust gas to be stored once it has passed through the seismic instrument. The housing segment 52 also contains a cable passageway 92 which appears on FIGS. 4 and 5 of the drawings.

The high pressure gas chamber may be charged initially at the surface before the instrument is lowered into the ground. Additionally an associated piston 54 may be used to provide pressurized gas with either a downward stroke of the piston 54 or on the return stroke. The purpose of the piston 54 is to allow the pneumatic reservoir 22 to be recharged while the seismic instrument is at operating depth in the earth. If the high pressure chamber of the pneumatic reservoir 22 is initially charged with liquified gas then sufficient gas supply is available such that in most cases of interest downhole recharge is unnecessary. In this instance the piston 54 is not moved and is only used to separate the high and low pressure chambers of the pneumatic reservoir 22.

In dry or unfilled holes, it may be desirable to periodically vent the low pressure chamber into the borehole between runs. This reduces the size required for the low pressure chamber and provides additional high pressure chamber space of gas supply. In shallow applications of up to 1000 feet in depth, both the high pressure and the low pressure chambers may be connected by hoses to the surface to eliminate the need for pressure chamber recharge.

Figure 3D:
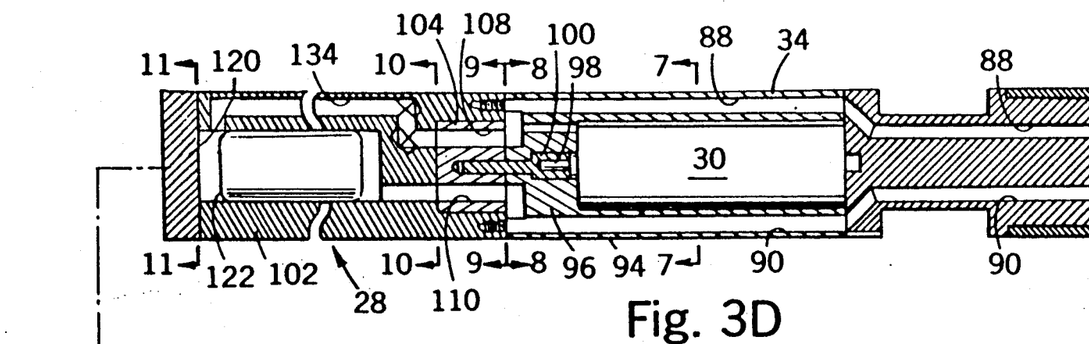

A fourth housing segment 94 is secured to the lower end of the segment 52 and houses the variable speed oscillator motor 30. The pressure passageway 88 and return passageway 90 are provided through the wall of the housing segment 94. Likewise, the cable passageway 92 passes therethrough.

Figures 4, 5, 6A, 6B, 7, 8, 9, 10, 11:
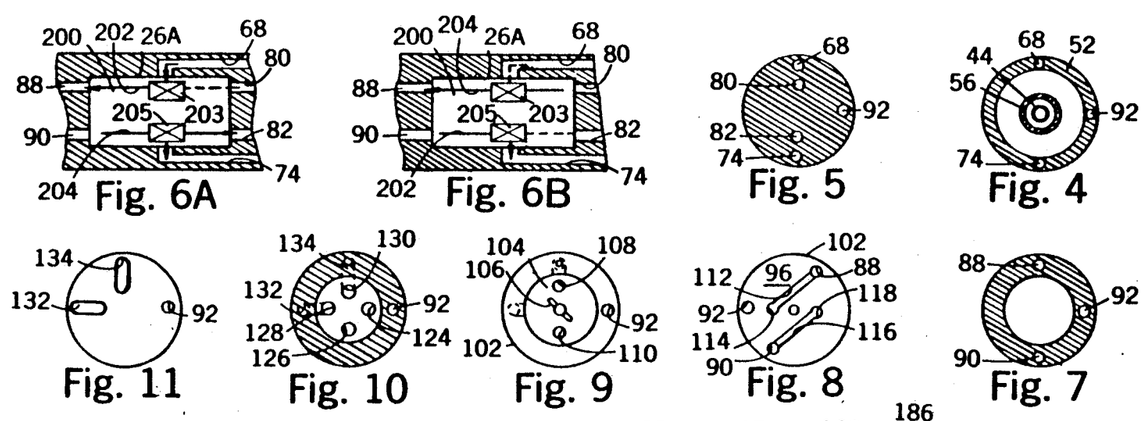
FIGS. 4 and 5 are end sectional views of the reservoir section taken along the broken lines 4—4 and 5—5, respectively, of FIG. 3C.
FIGS. 6A and 6B schematically depict an embodiment of a directional control valve contained in the reservoir section.
FIGS. 7-11 are end sectional views of the oscillating hammer section taken along the broken lines 7—7, 8—8, 9—9, 10—10, and 11—11, respectively, of FIG. 3D.

A block member 96 is provided at the lower end of the motor 30 and serves as a manifold for the pressure and return passageways 88 and 90, respectively. A rotary output shaft 98 of the motor 30 is provided with an extension shaft 100 which is journaled in the block 96 and extends there through into a fifth housing segment 102. A rotary valve member 104 is journaled in the housing segment 102 and is coupled to the rotary shaft extender 100 by key member 106 as depicted in FIG. 9 of the drawings. The rotary valve member 104 is cylindrical in shape and is provided with a pair of spaced longitudinal bores 108 and 110 therethrough.

The lower end of the block member 96 is provided with oppositely disposed longitudinal bores at the outer periphery thereof which are connected with and form a part of the pressure and return passageways 88 and 90, respectively. The lower end of the bore 88 terminates at the lower end of the blockmember 96 and is in open communication with an inwardly extending groove or recess 112 which terminates with a circular recess 114 as depicted in FIG. 8 of the drawings. Likewise, the bore 90 is in communication with a similar inwardly extending groove or recess 116 which terminates in a circular recess 118. The circular recesses 114 and 118 are disposed on opposite sides of the center of the lower end of the block 96 and are spaced apart by the same distance as the longitudinal bores 108 and 110 of the rotary valve member 104. The bores 108 and 110 are in intermittent communication with recesses 114 and 118 and the grooves 112 and 116 when the member 104 is made to rotate.

A longitudinally disposed oscillator chamber 120 is contained within the housing segment 102 directly below the rotary valve member 104. An oscillating piston or hammer 122 is slidingly disposed within the chamber 120 for induced oscillation in a manner that will be hereinafter set forth.

Referring to FIGS. 3D and 10 of the drawings, four ports 124, 126, 128, and 130 are spaced 90 degrees apart and are in intermittent communication with the longitudinal passageways 108 and 110 upon rotation of the rotary valve 104. The ports 124 and 126 which are 90 degrees apart are connected in open communication with the upper end of the oscillatory chamber 120. The port 124 serves as a pressure port while the port 126 serves as a return port in a manner that will be hereinafter set forth.

The ports 128 and 130 which are 90 degrees apart are connected to the lower end of the oscillatory chamber 120 through longitudinal passageways 132 and 134 respectively. The passageway 132 serves as a return passageway while the passageway 134 serves as a pressure passageway.

In operation, oscillatory motion of the hammer 122 is provided as follows: Rotation of the rotary valve member 104 is effected by the variable speed motor 30.

When the rotary valve member is in the position shown in FIG. 9 of the drawings, gas under pressure from the pneumatic reservoir 22 enters the groove 112 from the passageway 88 in the block member 96. The pressure is then applied through the passageway 108 of the rotary valve 104 into the port 130 and to the lower end of the oscillatory chamber 120 through the passageway 34 causing the hammer or piston 122 to move upwardly or to the right as shown in FIG. 3D of the drawings.

Exhaust gas from the upper end of the oscillatory chamber 120 exits the port 126 through the passageway 110 of the rotary valve 104 and into the return passageway 90 through the groove 116.

Considering the rotary valve moving in a counterclockwise direction as viewed in FIG. 3D and FIGS. 9, 10, and 11 of the drawings, when the passageway 110 comes into alignment with the port 124, it will also be in alignment with the recess 114 receiving gas under pressure from passageway 88 thereby applying pressure to the upper portion of the oscillatory chamber 120 causing the piston to move in a downward direction. Exhaust from the lower portion of the oscillatory chamber 120 is routed through passageway 132 and port 128 wherein it passes back through the rotary valve member passageway 108 and into the return passageway 90 of the block member 96.

As the rotary valve continues to move in a counter-clockwise direction by an amount of 90 degrees, the process is reversed and repeated thereby imparting oscillatory motion to the hammer member 122. Therefore, it is apparent that for each 360 degree of rotation of the rotary valve member 104, the hammer member 122 completes two oscillations.

Further, it has been found that by proper sizing of the return ports 126 and 128, or for that matter anywhere along the return passageways, the exhaust gas tends to back up and cause a cushioning or spring effect at each end of the travel of the oscillating hammer 122. By controlling the mass of the oscillating hammer along with the return gas passageway restriction, the resonant frequency of the oscillating hammer can be adjusted within limits.

Figure 12:
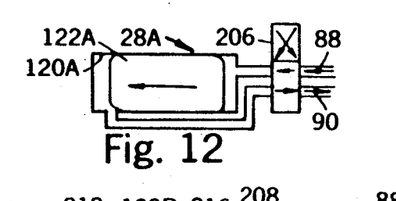
FIGS. 12 and 13 schematically depict an embodiment of the hammer control valve of the oscillating hammer section.

The use of side exhaust ports as shown in FIG. 12 of the drawings insures that a predictable portion of gas is contained to form a gas spring during each oscillation of the hammer. The rotary valve alone does not insure that a predictable amount of gas is contained at the end of the chamber because there is a phase shift that occurs between the position of the hammer and the rotary valve resonance. The resonant frequency is determined by the compression resistance or stiffness of the gas spring and the mass of the hammer. The effect of resonance and the harmonics of resonance is to significantly increase the seismic output in the vicinity of the resonant and resonant harmonic frequencies.

It has further been determined that as the speed of rotation of the rotary valve member 104 is increased, the efficiency of the routing of the gas to the oscillating hammer decreases which in ordinary circumstances would cause the seismic output from the oscillating hammer to decrease as the frequency of oscillation increases. However, by establishing the resonant frequency of the oscillating hammer system slightly above the maximum frequency of oscillation, as the hammer nears its resonant frequency, the output energy is increased thereby causing the ratio of input energy to output energy to remain substantially flat and thereby producing seismic vibrations of somewhat constant amplitude over the entire frequency range. This effect can also be achieved by establishing the resonant frequency of the oscillating hammer system in the lower portion of the frequency sweep range. In this latter case the increased seismic output at resonance and at successive harmonics of the resonance cause the seismic output to remain large and relatively flat over a wide frequency range of operation.

It is also noted that the cable passageway 92 extends through the housing segment 102 as depicted in FIGS. 8 through 11.

Figure 3E:
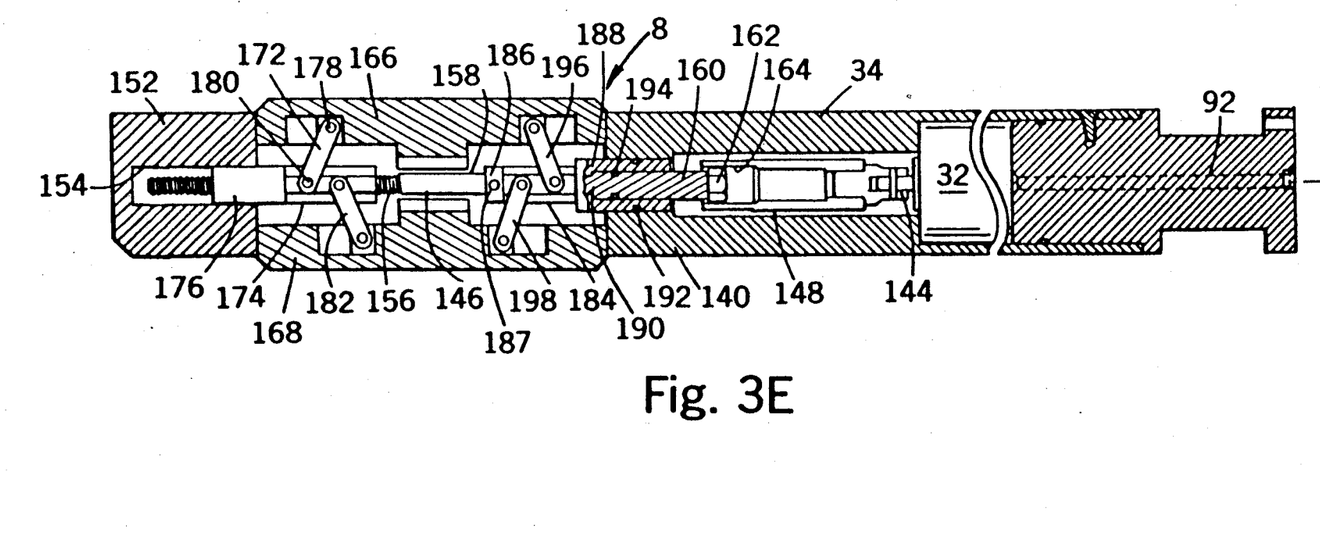

The fifth and lower-most housing segment 140 contains a clamping apparatus 18 and its associated drive motor 32. The motor 32 is provided with a downwardly extending drive shaft 144 which is in turn operably connected to an elongated particularly threaded drive rod 146 through a coupling device 148.

Figure 16:
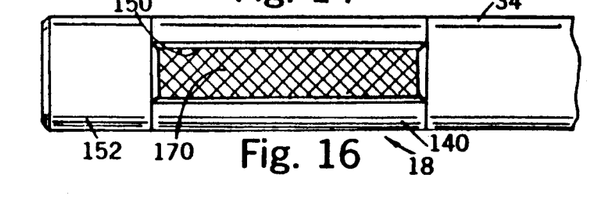
FIG. 16 is a view of the clamping apparatus in FIG. 14 rotated 90 degrees.

The lower portion of the housing segment 140 comprises a pair of oppositely disposed elongated slots one of which is shown in FIG. 16 and is indicated by reference character 150. The lower end of the housing 34 is provided with an end plate 152 having a centrally disposed recess 154 therein.

The drive rod 146 comprises a lower end threaded portion 156 adjacent to a smooth segment 158. The upper end of the rod 146 has a second smooth shank portion 160 terminating in a polygonal head or wrenching element 162.

The coupling member 148 is provided with a lower sleeve member 164 which has a polygonal cross sectional shape compatible with the wrenching element 162 which serves to impart rotary motion to the drive rod 146 while allowing longitudinal movement of said drive rod with respect to the coupling member 148.

The clamping apparatus 18 further comprises one or more outwardly extendable shoe members 166 and 168 which are moveable through the elongated slots 150. The outer surfaces of the shoe members 166 and 168 are knurled as indicated by reference character 170 in FIG. 6 to enhance their gripping engagement with the borehole wall 12. The lower end of the shoe member 166 is operably connected to the drive rod 146 by a linkage arm 172 and a sleeve member 174. The sleeve member 174 is threadily carried on the threaded portion 156 of the drive rod 146 and has a lower portion 176 which is reciprocally disposed as a guide member in the recess 154 of the end plate 152. The linkage arm 172 is pivotally attached at each end by pins 178 and 180.

Figure 14:
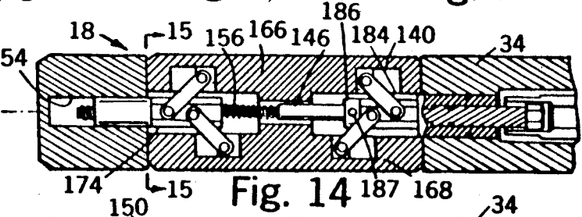
FIG. 14 is a sectional view of the clamping apparatus of FIG. 3E with the shoe members fully retracted.

Likewise, the lower end of the shoe member 168 is pivotally attached to the sleeve member 174 by a similar linkage arm 182, the linkage arms 172 and 182 being set at an angle with respect to the longitudinal axis to form a scissor jack arrangement as shown in FIGS. 3E and 14. The smooth cylindrical portion 158 of the drive rod 146 is provided with a sleeve member 184 which is spaced above the sleeve member 174. The drive rod 146 is permitted to rotate inside the sleeve member 184 and the sleeve member 184 is held in place on the drive rod by a lower collar member 186 with associated pin 187 and an upper elongated sliding plug member 188. The plug member 188 is bored to receive the shank portion 160 of the drive rod and is provided with a shoulder portion 190 to assure that the plug member 188 moves longitudinally with the drive rod 146.

Fluid seals between the clamping member 18 and the drive motor 32 are accomplished by "0-rings" 192 and 194 which are carried by the plug member 188 and the drive rod shank 160, respectively.

The upper end of the shoe member 166 is pivotally connected to the sleeve member 184 by a linkage arm 196 while the upper end of the shoe member 168 is pivotally connected to the sleeve member 184 by a linkage arm 198. The linkage arms 196 and 198 are again set at an angle with respect to the drive rod 146 in a scissor-jack arrangement opposite to the linkage arms 172 and 182.

The arrangement of the linkage arms are such that when the sleeve members 174 and 184 are caused to move closer together, the linkage arms force the clamping shoe members 166 and 168 outwardly into engagement with the borehole wall. On the other hand when the sleeve members 174 and 184 are moved farther apart, the clamping shoes 166 and 168 are retracted into the elongated slots 150 to assume a position flush with the configuration of the housing 134 as shown in FIG. 14.

The drive motor 32 is a reversible servo-motor which is capable of driving the clamping shoe members to a desired position and holding the members at that position until the motor 32 is again activated.

Figure 15:
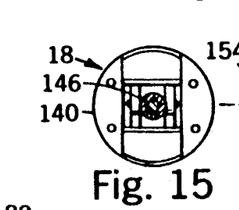
FIG. 15 is an end sectional view of the apparatus of FIG. 14 taken along the broken lines 15—15.

In operation, assume that the clamping members start in a retracted position as shown in FIG. 14 and that the threaded portion 156 of the drive rod 146 are right-hand threads. Rotation of the drive rod 146 in a counter-clockwise direction as shown in FIG. 15 would cause the sleeve member 174 to start moving upwardly or to the right as viewed in FIG. 14 thereby forcing the lower end of the clamping shoes 166 and 168 outwardly. When the lower portion of the shoes can no longer be extended or bind up, then rotation of the drive rod 146 causes the drive rod itself and the upper sleeve member 184 to move downwardly or to the left as shown in FIG. 14 thereby forcing the upper portion of the shoe members 166 and 168 to move outwardly. Rotation of the drive rod 146 is continued until the shoes are extended as shown in FIG. 3E.

Rotation of the drive rod 146 in the opposite direction then causes the sleeve members 174 and 184 to move away from each other thereby retracting the shoe members 166 and 168.

Referring now to FIGS. 6A and 6B of the drawings, reference character 26A indicates a schematic arrangement of a second embodiment of the directional control valve 26 which contains a valve member 200 having a T-shaped passageway 202 Intersection, at a solenoid operated valve 203 and a second T-shaped passageway 204 intersecting at a second solenoid operated valve 205.

When the valve member 200 is positioned as shown in FIG. 6A, the return passageway 90 is operably connected to the passageway 82 thereby providing exhaust or return gas to the lower side of the pneumatic reservoir 22. Simultaneously the T-shaped passageway 202 provides communication between pressure passageway 88 and the passageway 68 to the upper end of the reservoir chamber 22.

When the valve member 200 is positioned as shown in FIG. 6B, the longitudinal passageway 204 operably connects passageways 88 and 80 while the T-shaped passageway 202 operably connects passageways 90 and 74.

Referring to FIG. 12 of the drawings, reference character 28A generally depicts an alternate embodiment of the oscillatory hammer system wherein the oscillatory chamber 120A containing a hammer 122A is operably connected through a two-position valve schematically represented as reference character 206. In the position shown, the pressure in the passageway 88 is connected to the upper portion of the oscillatory chamber 120A while the lower portion is connected to the exhaust passageway 90.

In a second position with the cross lines being in communication with the passageways, pressure from the line 88 would be directed to the lower portion of the oscillatory chamber 28 while the upper portion would be connected to exhaust. It is noted that in this arrangement a restriction of the exhaust passageway would be placed in the passageway 90 as opposed to the oscillatory chamber port.

Figure 13:
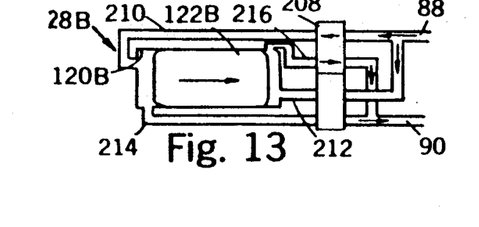

Referring now to FIG. 13 of the drawings, a third embodiment of the oscillatory hammer is generally represented by reference character 28B, the piston or hammer being designated as 122B while the oscillatory chamber is designated as 120B. An alternate oscillatory valve arrangement is indicated schematically by reference character 208. In this arrangement it can be seen that passageways 210 and 212 are designated as pressure passageways while passageways 214 and 216 serve as exhaust passageways.

From the foregoing it is apparent that the present invention provides a substantially selfcontained downhole periodic seismic generator which requires only electrical power and control lines and support cabling connected to the well head.

Whereas the present invention has been described in particular relation to the drawings attached hereto, other and further modifications apart from those shown or suggested may be made within the spirit and scope of the invention as claimed.

We claimed:

1. A downhole periodic seismic source for operation within a borehole to produce predominantly sheer waves through surrounding earth strata comprising:
   a housing;
   means for lowering said housing into a borehole;
   clamping means carried by the housing for selectively, rigidly clamping said housing to the wall of the borehole;
   self contained pneumatic reservoir means carried by the housing;
   a longitudinal pneumatic oscillator carried by the housing; and
   valve means operably connected between the reservoir and the oscillator for reciprocally driving said oscillator longitudinally with respect to the borehole at frequencies to produce predominantly shear waves,
whereby vibratory predominantly shear waves are transmitted into the surrounding earth strata.

2. A periodic seismic source as set forth in claim 1 wherein said clamping means comprises one or more shoe members engageable with the wall of the borehole, a reversible servo motor, and scissor-jack screw means operably connected between the servo motor and the shoe members for selectively retracting or extending said shoe members into rigid engagement with the wall of the borehole.

3. A periodic seismic source as set forth in claim 2 wherein the shoe members comprise three radially spaced shoe members.

4. A periodic seismic source as set forth in claim 3 wherein the scissor-jack screw means comprises a centrally longitudinally disposed threaded rod reciprocally and rotatably carried by the interior of the housing, a first end thereof being operably connected to the motor, a pair of spaced sleeve members carried by the threaded rod and relatively movable with respect to each other, spaced linkage arms operably connected between each shoe member and said sleeve members whereby rotation of the rod in one direction causes relative movement of the sleeve members and linkage arms thereby extending the shoe members and rotation of the threaded rod in the opposite direction causes reverse relative movement of the sleeve members and linkage arms thereby retracting said sleeve members.

5. A periodic seismic source as set forth in claim 4 wherein said first end of the threaded rod is provided with a polygonal wrenching member, and including an elongated similar shape polygonal sleeve member carried by the motor for rotation therewith, said wrenching member being reciprocally disposed in the polygonal sleeve member whereby rotation of the polygonal sleeve member imparts rotation to the rod while said rod is longitudinally moveable with respect to said sleeve member.

6. A periodic seismic source as set forth in claim 5 wherein one of said sleeve members is threadily carried by said rod and the second is slidably positioned longitudinally on said rod, the rod being rotatable with respect thereto, said housing comprising a plurality of transverse passage ways in the housing for directing the transverse travel of each said shoe member.

7. A periodic seismic source as set forth in claim 1 wherein the self-contained pneumatic reservoir means comprises an elongated pneumatic gas chamber, an electric motor carried by the housing, a rotatable shaft operably connected to the motor and extending into the gas chamber and including means for converting rotary motion into reciprocal motion, a gas piston reciprocally disposed in the chamber and operably connected to said shaft, and pneumatic porting means carried by the housing and having a pressure passageway operably connected between the gas chamber and the valve means whereby longitudinal travel of said piston forces gas under pressure through the pneumatic porting means to the valve means.

8. A periodic seismic source as set forth in claim 7 wherein the said gas piston is double acting and said pneumatic porting means comprises an exhaust gas return passageway and a directional control valve means in communication with both portions of the gas chamber for connecting the return passageway to a low pressure side of the gas piston regardless of its direction of travel.

9. A periodic seismic source as set forth in claim 8 wherein the directional control valve means comprises at least one electrically operated solenoid valve.

10. A periodic seismic source as set forth in claim 8 wherein the directional control valve means comprises a plurality of check valves.

11. A periodic seismic source as set forth in claim 1 wherein the longitudinal pneumatic oscillator comprises an elongated cylindrical chamber, first gas passageway means operably connected between a first portion of the chamber and the valve means, second gas passageway means operably connected between second opposite portion of the chamber and the valve means and a gas hammer member reciprocally disposed in the chamber, said valve means selectively providing pressurized gas pulses alternatively through said first and second gas passageway means causing said hammer to oscillate within the chamber to produce periodic vibration.

12. A periodic seismic source as set forth in claim 11, wherein the first gas passageway means comprises a first pressure input passageway and a first exhaust outlet passageway, the second gas passageway means comprises a second pressure input passageway and a second exhaust outlet passageway, and said exhaust outlet passageways are so disposed that cushioning for the pneumatic oscillator is provided at both ends of its travel.

13. A periodic seismic source as set forth in claim 11 wherein the valve means comprises an electric motor and a rotary valve connected thereto, said rotary valve having two passageways alternatively connectable to said first and second gas passageway means to alternatively provide pressure and exhaust connections to the gas chambers of opposite sides of the hammer.

14. A periodic predominantly shear source as set forth in claim 13 wherein the electrical motor is a variable speed motor capable of adjustment in speed to provide hammer oscillation over a frequency range.

15. A periodic seismic source as set forth in claim 14 wherein said first and second passageway means are ported such that some gas remains in the chamber during exhaust thereby providing a gas spring with each stroke of the hammer and wherein the mass of the hammer and the gas spring are designed to produce a resonant frequency, said resonant frequency being above the upper end of said discreet frequency range or low in said discreet frequency range to yield numerous resonance harmonics within said discreet frequency range.

16. A downhole periodic predominantly shear source for operation within a borehole to produce seismic waves through surrounding earth strata comprising:
   a housing adapted for lowering into the borehole by a cable means;
   clamping means carried by the housing for selectively, rigidly clamping said housing to the wall of the borehole;
   pneumatic oscillator means carried by the housing for producing periodic vibration in the housing;
   a pneumatic pressure source; and
   drive means connected between the pneumatic pressure source and the pneumatic oscillator means for producing predominantly shear waves.

17. A periodic seismic source as set forth in claim 16 wherein the drive means comprises a variable speed electric motor, a rotary valve connected to the output of the electric motor and pneumatically connected between the pressure source and the oscillator whereby the resonant frequency of the piston oscillator is established such that a sufficient number of resonant and harmonic frequencies occur within the discreet frequency range of operation to produce a substantially flat seismic power output over said discrete frequency range.

18. A periodic seismic source as set forth in claim 17 wherein the means carried by the oscillator comprises a pneumatic oscillator chamber, a reciprocating hammer member disposed in said chamber, porting means carried by the chamber wherein the design of the mass of said hammer and set porting means combined to produce a resonant frequency just above the upper end of said discreet frequency range or low in said discreet frequency range to yield numerous resonance harmonics within said discreet frequency range.

* * * * *